Aug. 15, 1933.  L. J. BURKE  1,922,229
GAME
Filed Sept. 24, 1931

INVENTOR.
Lawrence J. Burke
BY John J Brezina
ATTORNEY.

Patented Aug. 15, 1933

1,922,229

UNITED STATES PATENT OFFICE 1,922,229

GAME

Lawrence J. Burke, Chicago, Ill., assignor to Poster Products, Inc., Chicago, Ill., a Corporation of Illinois Application September 24, 1931
Serial No. 564,828

10 Claims. (Cl. 35—12)

This invention relates to a game or the like comprising and employing a novel means of removably holding pieces or segments of vari-colored material on a background of a substantially similar material having a hair-like surface. This game is very satisfactorily adaptable for kindergarten and for entertainment and education of children. It may also be used in removably attaching letters in advertising display signs and other displays.

An object of my invention is the provision of a game which is educational and entertaining to children and which teaches them the shapes of various objects as well as the alphabet, figures, pictures and the skill of differentiating and combining various colors and designs.

A further object of my invention is the provision of a means which may be very satisfactorily employed in art and display work such as advertising displays and signs and in which the background and letters are made of a material having a hair-like surface, the adjacent hair-like surfaces of the designs or letters inter-engaging with a like surface of the background and permitting periodical removal without injury or destruction of the designs and letters or of the background.

Other and further important objects of this invention will be apparent from the disclosures in the specification and the accompanying drawing.

This invention (in a preferred form) is illustrated in the drawing and hereinafter more fully described.

Figure 1:
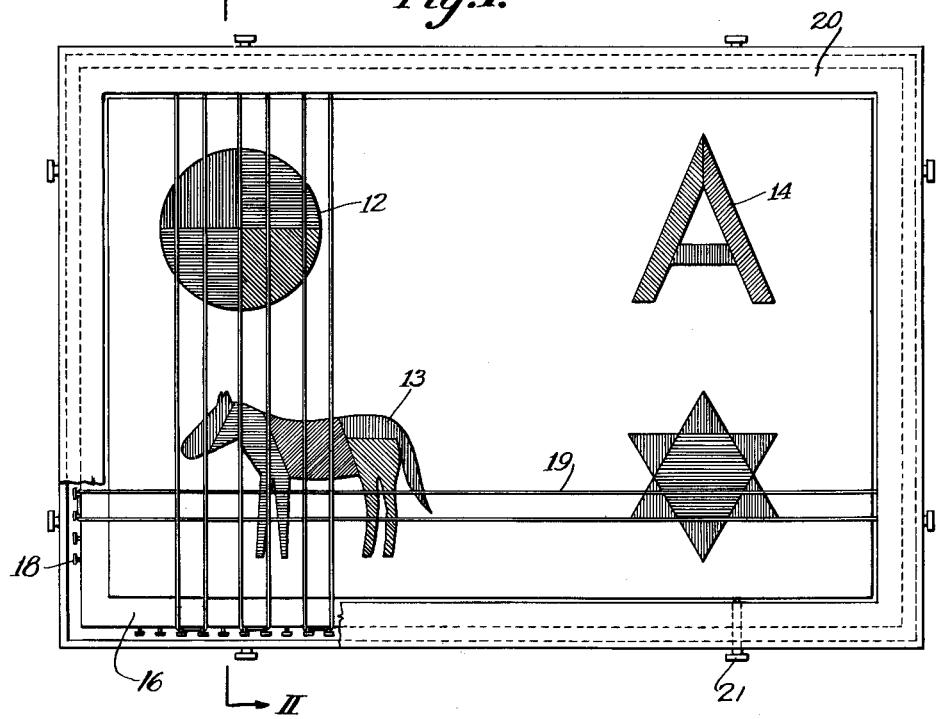
Fig. 1 shows a top plan view of a convex background or base member having pictorial or object representations thereon, said pictorial and object representations comprising a plurality of assembled vari-colored sectors.

The reference numeral 10 indicates a flexible base member which has a multiplicity of hair-like tentacles protruding above the surface of said base member. The base member 10 may be made of certain grades of felt material which has numerous hair-like members or tentacles protruding outwardly from either one or both flat sides. Such felt may be made more satisfactory for the purpose of my invention by brushing the same with a brush to cause a greater number of the hair-like members and tentacles to project from the felt surface, and said projecting tentacles may be made stiffer by a thin application of a hot liquid solution containing paraffine or other solidifying or partially solidifying material.

The base 10 may be of any size or shape desirable, but in my preferred form shown in Fig. 1 I have shown it rectangular as this is most desirable for use in a game and is conveniently packed in a box.

My game includes a large number of cut-out pieces of hair-surfaced felt of varied designs, shapes and colors, the sectors being of such shape as to form pictures, numbers and letters of the alphabet and representations of various objects known to children when assembled. The reference numeral 12 represents a plurality of felt sectors assembled together to represent a ball.

Numeral 13 represents a horse and comprises a number of assembled sectors each of a different color as indicated.

14 represents the letter A, which in this instance comprises three assembled sectors each of a different color as indicated.

Each game includes a number of hair-surfaced cutouts of various geometric shapes particularly known to children; for example, circles, semi-circles, triangles, squares, etc., which permit assembly by the child to form various pictures and object representations. In playing, the child will first spread out base member 10, then select the desired hair-surfaced sectors and assemble them by placing each one into its proper position to gradually build up the image of the object or picture in mind, which image may be suggested by pictures or actual objects. When the hair-surfaced sectors are placed on the base member 10, the tentacles of the member 10 and the sectors will entangle and inter-engage to cause said sectors and consequently the representations which they comprise to be held with fair degree of firmness together and on said base member.

A frame 16, which may be made of four pieces of wood jointed and secured together at their ends as shown, is made of a size adapted to slip over the base 22 and its attached parts as herein described. The frame 16 is preferably recessed to form an outer groove 17 as clearly shown in Fig. 2. Short nails 18 are horizontally driven into the frame 16 at regularly spaced intervals in a manner so that the extending head portion of each of the nails 18 is within the groove 17, as shown in Figs. 1 and 2.

Elastic bands 19 may be hooked about nails 18 on opposite sides of the base 22 as shown in Fig. 1 and in a manner so that the bands connecting opposite sides of the base 22 are substantially perpendicular to each other. The bands 19 may be of rubber, thread, or netting having some degree of elasticity.

Figure 2:
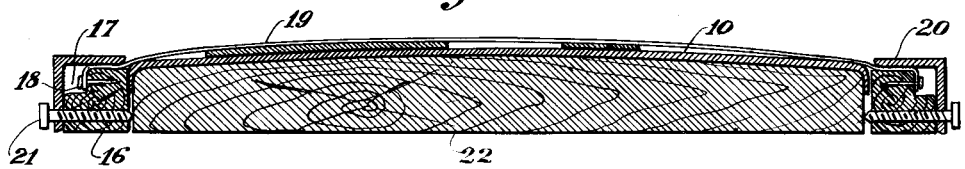
Fig. 2 is a cross sectional view of a removable sector having a hair-like surface.

A rectangular metal frame member 20 comprising four members L-shaped in cross section joined to form a rectangle and of a size adapted to fit over the frame 16, is removably mounted over the frame 16 so that the inner edge thereof will engage the bands 19 to hold said bands adjacent the upper surface of the frame as shown in Fig. 2. It will be apparent that the bands may be tightened by merely pushing the frame as far as possible about the base 22. The frame 16 and metal frame 20 have a plurality of horizontal apertures therethrough on two opposite sides thereof, said apertures through the metal frame 20 being threaded from the reception of thumb screws 21 which have knurled heads and rounded ends which are adapted to engage the edge of the base 22 to hold the frames 16 and 20 in a position to maintain the bands 19 taut and in contact with the pictorial or design representations assembled on the hair-surfaced member 10'.

It is only necessary to remove the frames 16 and 20 with their bands 19 from the base member 22 when the child desires to assemble new designs which it may again preserve by again placing the frames 16 and 20 with said bands in a manner herein described.

This is highly desirable as the sectors or the representation which a number of assembled sectors comprise will not move easily nor fall off in ordinary handling, but will remain until pulled apart manually. This highly important removable connection between representations or letters and the base or background is novel and cannot be attained by the use of paper or other substantially smooth-surfaced material.

My game has great educational value in that in assembling vari-colored sectors and the representations of objects or artistic designs the child will not only acquire an accurate memory of the representations of various objects but will also acquire artistic skill in combination of colors to create the most desirable effects. By use of the game having vari-colored alphabetical letters made of a material having hair-like surfaces the child will learn to combine the letters of words and thereby to spell.

My invention may be very satisfactorily employed in advertising display designs wherein representations of objects and letters combined to make any desired words may be quickly mounted on the background and removably held in desired position as long as desired.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a game or the like, a rigid backing member; a porous and hair-surfaced material on said rigid member; projecting studs on the periphery of said frame; a frame adapted to snugly receive said rigid member; and elastic means adapted to engage the projecting studs on opposite sides of said frame member and hold a plurality of hair surfaced segments in position.

2. In a game or the like, a rigid frame having studs or the like projecting from its periphery; an irregularly surfaced member in said frame; a porous hair-surfaced material secured on said member; and means removably engaging the studs on opposite sides of said rigid member and adapted to hold a plurality of hair surfaced segments in contact with said material.

3. In a game, a rigid base member; a porous hair-surfaced material secured on said rigid member; a frame adapted to fit about said rigid member having studs or the like projecting from its periphery, and means removably engaging the studs on opposite sides of said frame and adapted to hold a plurality of hair surfaced segments in assembled relation.

4. An article of the class described comprising a base member having a hair-like surface; a frame adapted to receive said base member, and elastic means removably secured on said frame and adapted to hold a plurality of hair surfaced pieces in engagement with said base member, and means on said frame to adjustably and removably lock said base member therein.

5. An article of the class described comprising a base member having a hair-like surface; felt-surfaced pieces adapted to be placed on said base member and assembled to form object representations; a frame adapted to receive said base member; and cables on said frame adapted to hold said pieces in engagement with said base member, and an L shaped member removably secured on the upper and outer sides of said frame adapted to hold said cables against said frame; and means for adjusting said segment holding means to exert varying degrees of pressure thereon.

6. A game comprising a base member having a hair-like surface; a frame adapted to receive said base member; a plurality of cables stretched across said frame, means on said frame adapted to removably hold said cables in position, and means on said frame adapted to releasably lock said base in said frame.

7. In a game or the like, a frame, a hair surfaced member removably mounted in said frame; and a plurality of strings stretched across said member and secured on said frame, and adapted to hold removably positioned segments adjacent said member.

8. In a game or the like, a frame, a hair surfaced member removably mounted in said frame; a plurality of strings stretched across said member and secured on said frame and adapted to hold removably positioned segments adjacent said member, and means in said frame for adjustably securing said member therein.

9. In a game or the like, a frame; a rigid member in said frame having an irregular surface; means on said frame for releasably and adjustably securing said rigid member in said frame, and means stretched across said member and secured to said frame adapted to hold removably positioned segments adjacent said member.

10. In a game or the like, a frame, an irregularly surfaced member in said frame; means for adjustably and removably securing said member in said frame; an elastic element stretched across said frame and removably secured thereon, and pieces of textile material positioned on said member, said elastic element holding said pieces in contact with said member.

LAWRENCE J. BURKE.